(No Model.) 2 Sheets—Sheet 1.
W. H. BACHE.
TROLLEY.
No. 527,546. Patented Oct. 16, 1894.
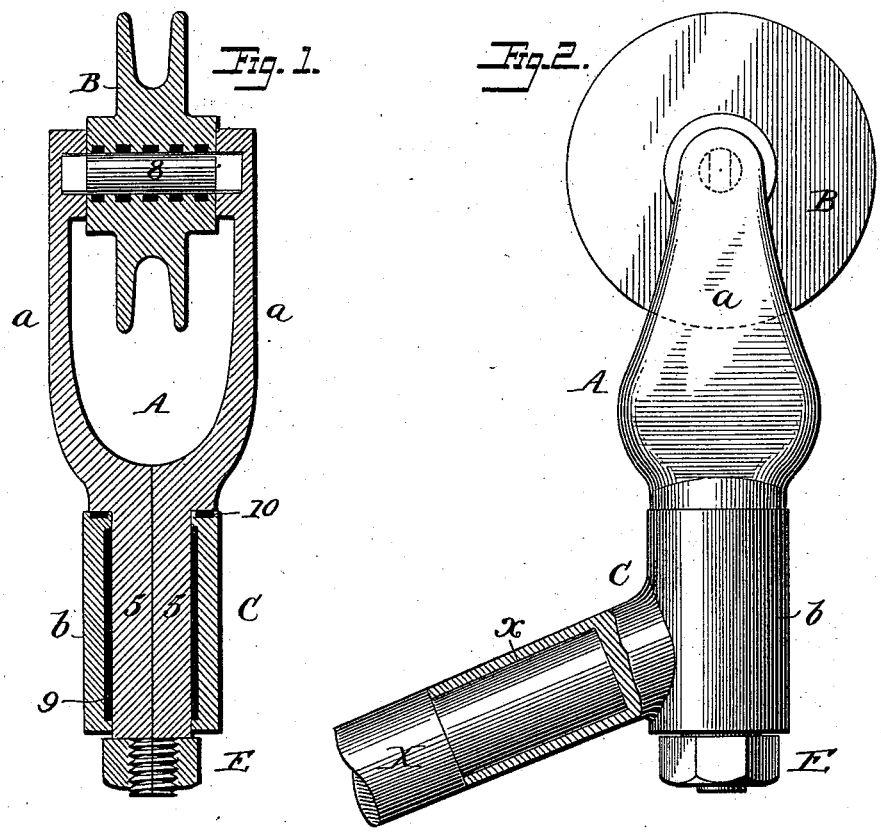
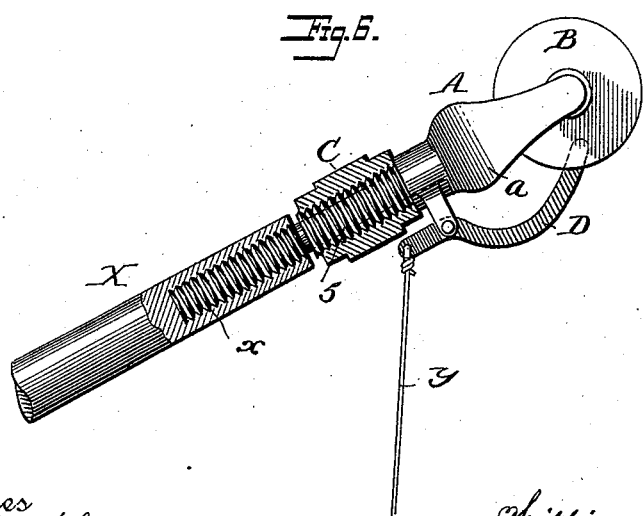
Witnesses
Jno G. Hinkel
A. N. Dobson
Inventor
William Henry Bache
By Foster Freeman
Attorneys (No Model.) 2 Sheets—Sheet 2.

W. H. BACHE.
TROLLEY.

No. 527,546. Patented Oct. 16, 1894.

Witnesses
Jno. G. Hinkel
A. W. Dobson

Inventor
William Henry Bache
By Saxen Freeman
Attorneys

UNITED STATES PATENT OFFICE.

WILLIAM HENRY BACHE, OF BOUND BROOK, NEW JERSEY.

TROLLEY.

SPECIFICATION forming part of Letters Patent No. 527,546, dated October 16, 1894.

Application filed October 31, 1893. Serial No. 489,629. (No model.)

*To all whom it may concern:*

Be it known that I, WILLIAM HENRY BACHE, a citizen of the United States, residing at Bound Brook, in the county of Somerset and State of New Jersey, have invented certain new and useful Improvements in Trolleys, of which the following is a specification.

My invention relates to that class of trolleys in which an arm carries a bracket supporting the bearings of the trolley wheel, and my invention consists in constructing the parts as fully set forth hereinafter so as to avoid the use of liquid lubricants and the necessity of constantly oiling the trolley, so as to facilitate the construction of the device, and more especially so as to enable any part of the device to be renewed or replaced should it become worn without the necessity of employing mechanics or special tools or appliances for making necessary repairs, and to this end I construct the parts as fully set forth hereinafter and as illustrated in the accompanying drawings, in which—

Figure 4:
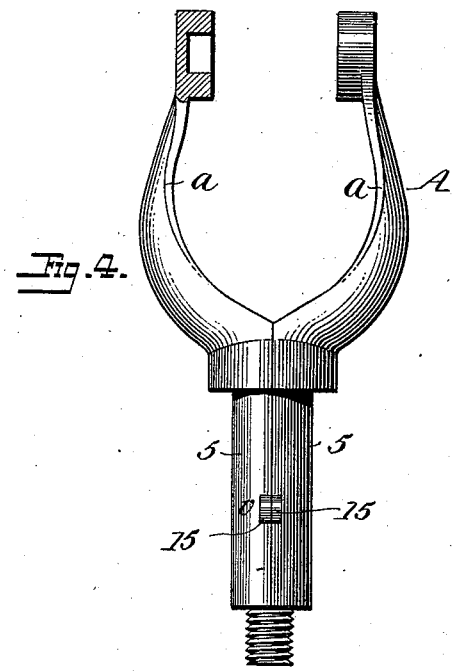
Figure 3:
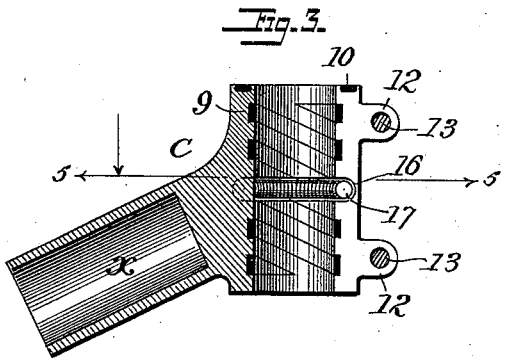
Figure 5:
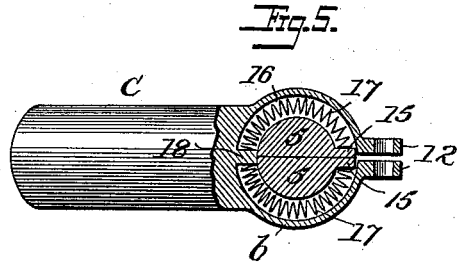

Figure 1, is a transverse, vertical section taken about centrally of Fig. 2. Fig. 2, is an elevation, in part section, showing a trolley with my improvements. Fig. 3 is an enlarged longitudinal section of the support for the bracket having additional features to those shown in Figs. 1 and 2. Fig. 4 is a detached view in part section of the trolley bracket adapted to the construction shown in Fig. 3. Fig. 5 is a transverse section on the line 5—5, Fig. 3. Fig. 6 is an external view illustrating an additional feature which I propose to employ in connection with the trolley.

The three principal parts of my improved trolley are the bracket A, the trolley wheel B, and the socketed support C. The support C has a hollow hub $b$ and an arm X with a socket $x$ for the reception of the end of the staff X of the trolley arm, which may be supported upon the car in any of the usual ways or in any suitable manner.

The bracket A consists of two branches or sections $a, a$ each of which has a semi-cylindrical projection 5, the two projections 5, 5, when brought together constituting the pintle of the bracket which extends into the socket in the hub $b$, the upper portions of the sections $a$ constituting the arms between which the trolley wheel B is supported upon a pin 8, the said pin being cylindrical in the center and angular at one or both ends, which ends fit in the sockets in the inner faces of the sections $a, a$, so that when the parts are put together in the position shown in Fig. 2, the pin will be confined and held immovably in its place without the use of bolts or screws or any fastening devices. The wheel B turns freely on the pin, while the sectional pintle extending into the socket of the hub $b$ is so confined that the two sections $a, a$, will be held properly in place without the use of any fastening devices other than that which may be necessary to prevent the pintle from slipping upward in its socket.

In some cases, it is desirable to hold the bracket A fixedly in position upon the support C, in other cases to permit it to turn in the said support, and different means of securing the bracket may be employed. Thus, as shown in Fig. 1 the ends of the sections 5, 5, of the pintle are reduced and threaded so as to form a threaded projection to which is adapted a nut E which will prevent the pintle from being drawn upward out of the socket, and where it is desired to hold the bracket firmly in place upon the support C, the nut may bear against the lower end of the hub $b$ and clamp the bracket immovably in position. As shown in Fig. 6, the outer surfaces of the pintle 5, 5, are threaded and clamped to the end of the pole by means of a nut run upon the above named threaded surfaces, the lugs 15 being dispensed with, or, if preferred, the inside surfaces of the two sections of the pintle are threaded and it is then secured on a thread cut on the end of the trolley pole. In most cases, however, it is desirable that the bracket should swing so that the trolley wheel will accommodate itself to the line of the wire, in which case the nut E should not bear firmly against the under side of the hub $b$ but should bear against the shoulder at the end of the pintle as shown, permitting the bracket to turn freely.

Where the bracket is to turn upon the support, it is desirable to facilitate this turning and to prevent friction and it is also desirable to avoid the use of oil in such constructions, and I therefore provide the hub $b$ with an annular recess or with a series of recesses 10 at the upper face or edge and also with one or more recesses 9 at the inner face, and fill these recesses with a lubricating composition, as for instance, a plumbago composition, so that the parts are constantly lubricated without the use of oil which would be attended with disadvantages where an electric current is used while the use of a plumbago lubricant serves to secure additional conductivity at the points where contact is apt to be broken. For the same reason, the bearing of the wheel B is lubricated by forming recesses at the inside of the bore of the said wheel in which the lubricant is inserted in a manner which it is not necessary to more particularly set forth.

In the construction shown in Fig. 1, the hub $b$ may consist of a solid cylinder bored through for the reception of the pintle, but in order to take up lost motion and to secure other advantages I prefer the construction illustrated in the other views in which the hub is split at one side, and provided with one or more projections or ears 12 on each side of the split, and bolts 13 are passed through openings in the said projections or ears and serve as a means of contracting the hub so as to fit close to the pintle as may be required either to clamp it immovably when desired, or permit it to turn but without too great freedom of motion.

In many instances it is desirable to permit the trolley wheel to swing to one side or the other as the line of conductor wire is carried in curves in one direction or the other, and it is also desired that normally the said wheel should be brought to a central position in the same plane as the vertical plane of the staff X, so that if the staff is carried away from the conducting wire, and then afterward carried toward the said wire, the wheel B will always be in position to permit the wire readily to enter the groove in the wheel. For this reason I combine with the bracket A means whereby it is carried normally to a central position while it is permitted to swing to one side or the other when desired. Different spring arrangements may be used for securing this result. As shown the pintle is provided with a projection $v$ which, when the pintle is divided as shown, consists of two lugs 15, 15 constituting when together a single lug which enters an annular recess 16 inside of the hub, the said recess having a central lug 18 constituting bearings on its opposite sides for two curved springs 17, 17, which extend between the bearing 18 and one of the sections of the lug on the pintle as best shown in Fig. 5, and which tend to maintain the bracket in its normal position, but if the curve of the wire causes the bracket to turn, either spring will be compressed to a greater or less extent according to the direction and the amount of the swinging movement of the bracket, but if the wheel is withdrawn from the wire, the springs will at once restore the bracket to its central position. It will be obvious that this construction has the further advantage that the lug on the pintle serves as a means of preventing the pintle from being lifted from its socket until the sections of the hub are spread far enough apart to permit this to be done when required. In some cases the springs may be omitted, the lug $v$ holding the bracket in place but permitting it to turn.

By the construction above described, it is possible to make the different parts of the trolley in such manner that the fracture, breaking or disabling of any one of the parts will not necessitate the services of a skilled mechanic or disable the apparatus in replacing the part which is injured. For instance, by dividing the bracket A into two parts, if one part is broken, the attendant upon the car can readily replace it by a duplicate with but little loss of time. Further, if the pin or axle 8 should become worn or broken it can be readily taken out and a new one inserted in its place, or if the wheel is broken the parts of the bracket can be separated and a new wheel placed in position; while if the wheel or its bearings wear so that it becomes too loose the inner faces of the pintle portion of the bracket may be ground away to a slight extent so as to bring the two arms $a$, $a$, closer together and the pintle may then be inserted in the socket and the latter may be contracted by tightening the bolt 13.

Where it is undesirable to depend upon the contact of the trolley wheel with the bracket as a means of conducting the current, from the wheel to the support I make use of a pivoted contact arm or lever D pivoted at any suitable point to the hub $b$, or any part of the support C and bearing at one end against the wheel B and having connected to the outer end the operating cord or wire $y$, the weight of which tends to keep the contact arm D in contact with the trolley B, the arm D conducting the current from the wheel to the support C and its connections.

Without limiting myself to the precise construction and arrangement of parts shown, I claim as my invention—

1. The combination in a trolley of a socketed support, and a bracket consisting of two sections branched to support the trolley wheel between them, and having arms or projections together constituting a split pintle adapted to the socket of the support, substantially as set forth.

2. The combination in a trolley of the socketed support C, the bracket A consisting of two sections having recesses at their inner faces for the reception of a transverse pin 8, and a trolley wheel B turning on said pin, substantially as set forth.

3. The combination of the support C having a socket and recesses 9, 10, filled with anti-friction composition, a bracket A having a pintle extending into the socket of the support C, and with a shoulder bearing upon the upper face of the said support, a transverse pin 8 supported between the arms of the bracket, and a trolley wheel turning upon the said pin and provided with internal recesses filled with anti-friction material, substantially as set forth.

4. The combination of the bracket A, its pin and trolley wheel and pintle, of a support C provided with a socketed split hub having ears 12 and transverse bolt or bolts passing through said ears, substantially as and for the purpose described.

5. The combination of the bracket, the trolley wheel supported thereby, the pintle constituting part of the bracket and a support having a hub split at one side and provided with ears and transverse bolts, substantially as and for the purpose set forth.

6. The combination of the trolley wheel, bracket, and pintle, and support C having a hollow hub with an internal recess containing springs 17, 17, a bearing 18 for said springs and a lug 15 on the pintle extending between said springs, substantially as and for the purpose set forth.

7. The combination with the support, bracket and wheel, of a pivoted contact arm and operating cord $y$, substantially as set forth.

8. The combination of a socketed support having an internal groove, a split bracket having a pintle extending into said support, and a lug on the pintle projecting into said groove, substantially as described.

9. The combination of a socketed support having an internal groove and a divided bracket having a divided pintle each section of the pintle being provided with a lug extending into said groove, substantially as described.

In testimony whereof I have signed my name to this specification in the presence of two subscribing witnesses.

WILLIAM HENRY BACHE.

Witnesses:
H. G. HERBERT,
R. H. BROKAW.